United States Patent
Meyles et al.

(10) Patent No.: US 11,301,426 B1
(45) Date of Patent: *Apr. 12, 2022

(54) MAINTAINING STABLE RECORD IDENTIFIERS IN THE PRESENCE OF UPDATED DATA RECORDS

(71) Applicant: Amperity, Inc., Seattle, WA (US)

(72) Inventors: Stephen Meyles, Seattle, WA (US); Yan Yan, Seattle, WA (US); Dan Suciu, Seattle, WA (US); Michael P. Fikes, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 250 days.

This patent is subject to a terminal disclaimer.

(21) Appl. No.: 16/675,789

(22) Filed: Nov. 6, 2019

Related U.S. Application Data

(63) Continuation of application No. 15/730,008, filed on Oct. 11, 2017, now Pat. No. 10,503,696.

(51) Int. Cl.
| | | |
|---|---|---|
| *G06F 7/02* | (2006.01) |
| *G06F 16/00* | (2019.01) |
| *G06F 16/174* | (2019.01) |
| *G06F 16/22* | (2019.01) |
| *G06F 16/28* | (2019.01) |
| *G06F 40/197* | (2020.01) |
| *G06F 17/16* | (2006.01) |

(52) U.S. Cl.
CPC ...... *G06F 16/1748* (2019.01); *G06F 16/2272* (2019.01); *G06F 16/285* (2019.01); *G06F 40/197* (2020.01); *G06F 16/288* (2019.01); *G06F 17/16* (2013.01)

(58) Field of Classification Search
CPC .... G06F 16/2365; G06F 16/93; G06F 16/901; G06F 17/2288; G06F 16/22; G06F 16/2379; G06F 16/2272; G06F 16/23; G06F 16/35; G06F 16/906
See application file for complete search history.

(56) References Cited

U.S. PATENT DOCUMENTS

| | | |
|---|---|---|
| 8,364,705 B1 | 1/2013 | Cooley et al. |
| 9,805,081 B2 | 10/2017 | Scott et al. |
| 10,007,689 B1 | 6/2018 | Ray et al. |
| 2006/0095370 A1* | 5/2006 | Seth ............... G06F 16/285 705/40 |
| 2009/0043824 A1* | 2/2009 | Claghorn ............... G06F 16/93 |
| 2011/0087668 A1 | 4/2011 | Thomas et al. |
| 2016/0217201 A1* | 7/2016 | Hummel ............... G06F 16/35 |
| 2018/0239760 A1 | 8/2018 | Kopylov |

\* cited by examiner

*Primary Examiner* — Bruce M Moser
(74) *Attorney, Agent, or Firm* — George David Zalepa; Greenberg Traurig, LLP

(57) ABSTRACT

The present disclosure relates to optimizing one or more database tables that may include one or more redundant records. Records are clustered and assigned stable identifiers. In this manner, the underlying records within a cluster are not removed or deleted. As updates to the database are made, new clustering analyses are performed using the underlying records and any updates made. Newly identified clusters are reassigned stable identifiers.

20 Claims, 9 Drawing Sheets

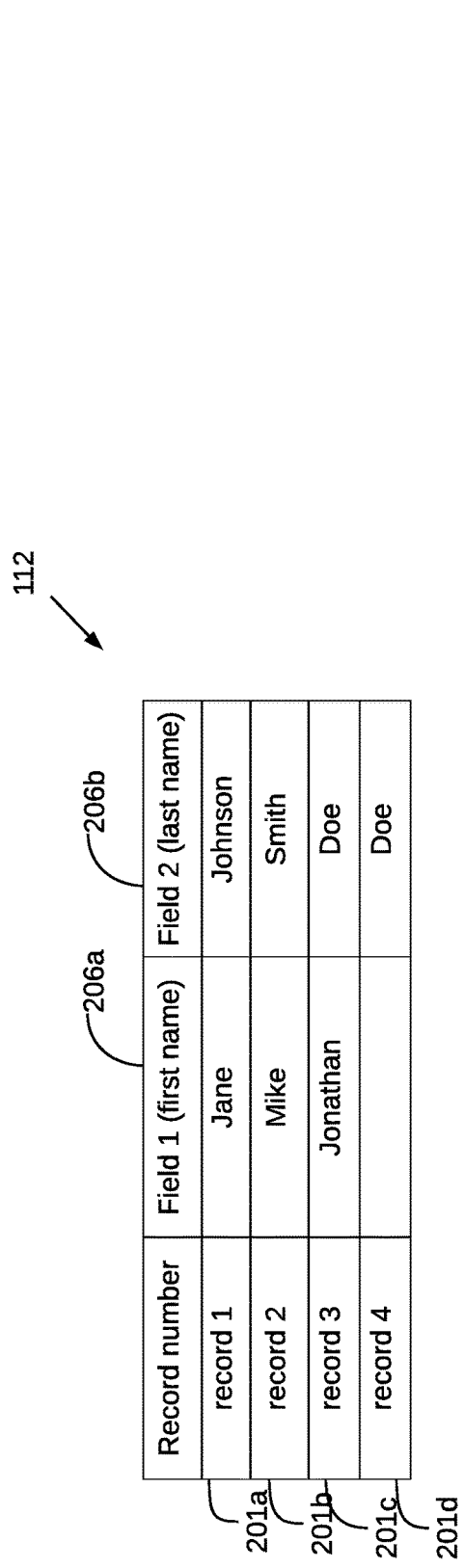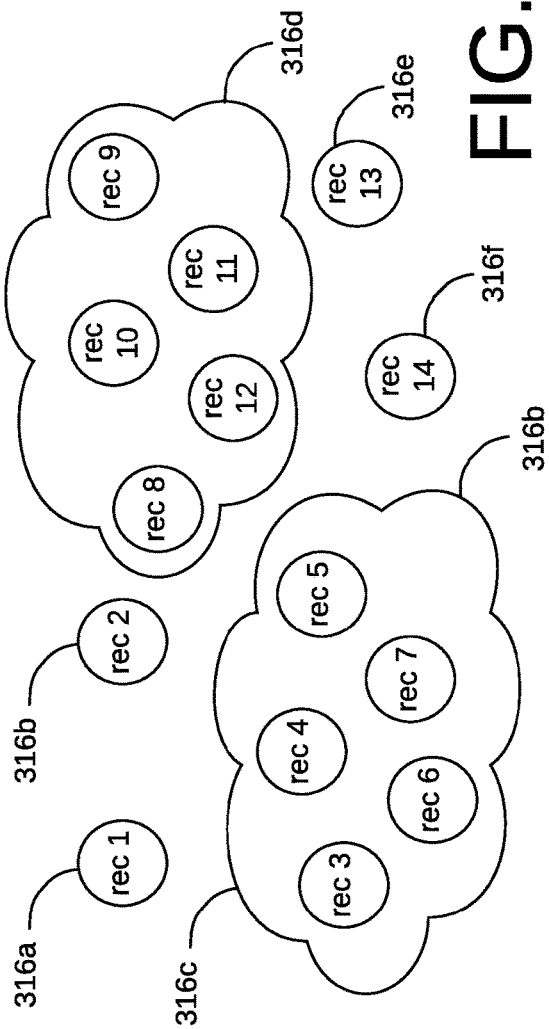

112a

| Record | Field 1 | Field 2 |
|---|---|---|
| record 1 | Jane | Johnson |
| record 2 | Mike | Smith |
| record 3 | Jonathan | Doe |
| record 4 |  | Doe | update 402 →

428a

| Record | Field 1 | Field 2 |
|---|---|---|
| record 1 | Jane | Johnson |
| record 2 | Mike | Smith |
| record 3 | Jonathan | Doe |
| record 4 | John | Doe |

| Record | Field 1 | Field 2 |
|---|---|---|
| record 1 | Jane | Johnson |
| record 2 | Mike | Smith |
| record 3 | Jonathan | Doe |
| record 4 |  | Doe | update 402 →

428b

| Record | Field 1 | Field 2 |
|---|---|---|
| record 1 | Jane | Johnson |
| record 2 | Mike | Smith |
| record 3 | Jonathan | Doe |
| record 4 |  | Doe |
| record 5 | John | Doe |

| Record | Field 1 | Field 2 |
|---|---|---|
| record 1 | Jane | Johnson |
| record 2 | Mike | Smith |
| record 3 | Jonathan | Doe |
| record 4 |  | Doe | update 402 →

428c

| Record | Field 1 | Field 2 |
|---|---|---|
| record 1 | Jane | Johnson |
| record 2 | Mike | Smith |
| record 3 | Jonathan | Doe |

FIG. 4C

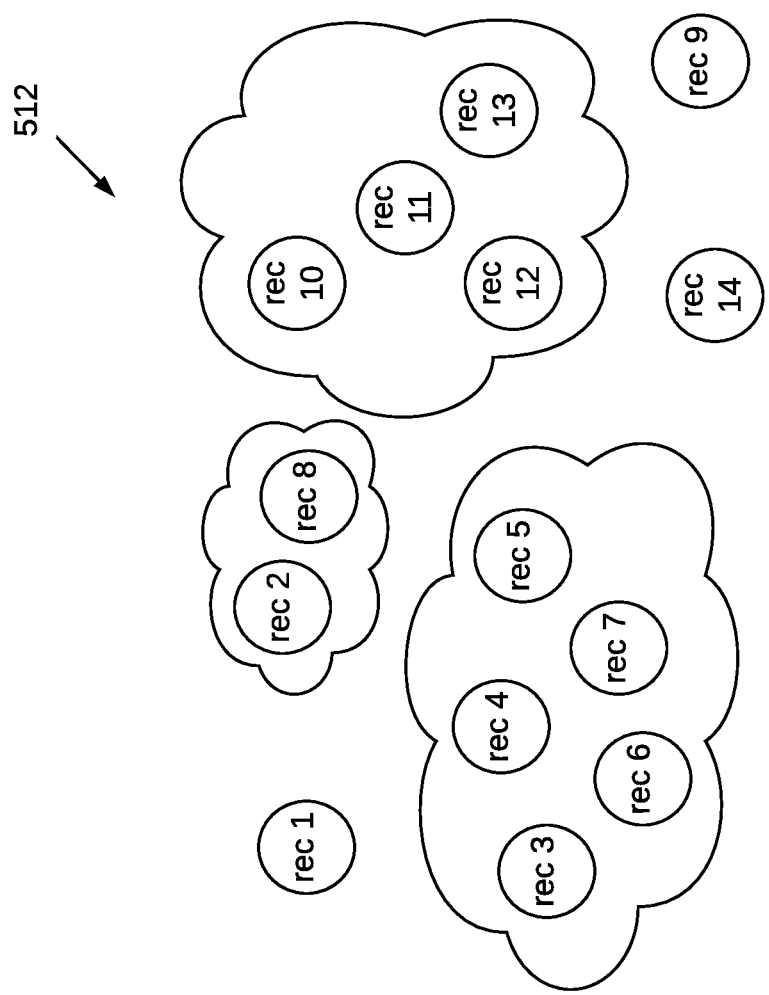

|  | B2 | B4 | B5 |
|---|---|---|---|
| A2 | 1 | 0 | 0 |
| A4 | 1 | 1 | 3 |
| A5 | 0 | 0 | 1 |

MAINTAINING STABLE RECORD IDENTIFIERS IN THE PRESENCE OF UPDATED DATA RECORDS

CROSS REFERENCE TO RELATED MATTERS

This application is a continuation of U.S. patent application Ser. No. 15/730,008 filed Oct. 11, 2017, which is hereby incorporated by reference in its entirety.

BACKGROUND

In the course of business, large amounts of data records are collected and stored in one or more databases. These data records may reflect customer information, business records, events, products, or other records pertinent to a relevant business. These records can accumulate from a number of data sources. For example, a retail company may sell products over different channels such as online e-commerce platforms as well as physical store locations. The retail company may maintain separate customer records for each of its different retail channels. More business transactions can create more business records. As another example, two separate businesses, each maintaining their own data records, may merge. The businesses may maintain data about customers where such data overlaps.

Combining data from different sources can be burdensome, time consuming and costly. The present disclosure describes systems and methods of managing a database that overcomes a number of the drawbacks of prior art solutions. The advantages and benefits of the present disclosure will be discussed in further detail.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 2 is an example of a database table 112 of FIG. 1 according to various embodiments of the present disclosure.

FIG. 3 is an example of clustered records existing within one or more database tables 112 of FIG. 1 according to various embodiments of the present disclosure.

FIGS. 4A-C are different examples of a database table being updated.

FIG. 5 is an example of clustering an updated database table 112 of FIG. 3 according to various embodiments of the present disclosure.

DETAILED DESCRIPTION

Various embodiments of the present disclosure relate to providing a software application that optimizes a database as it is updated with records. A database may store multiple records that represent the same thing. For example, "John Doe," "Jonathan Doe," and "J. Doe" could be three different records, but in reality these records represent the same entity, a single person named "John Doe." To avoid redundancy, these records may be grouped using clustering techniques discussed in further detail below. The cluster of records is assigned a stable identifier (ID) that can persist as the database is updated (e.g., changing a preexisting record, adding a new record, deleting a preexisting record).

Specifically, the cluster of records represented by a stable ID is maintained and used in conjunction with updates to the database. The use of stable IDs avoids drawbacks relating to collapsing a group of similar records into one surviving record. Using stable IDs also avoids the problem of optimizing an already optimized database, which can be a lossy process. In the following discussion, a general description of the system and its components is provided, followed by a discussion of the operation of the same.

Figure 1:
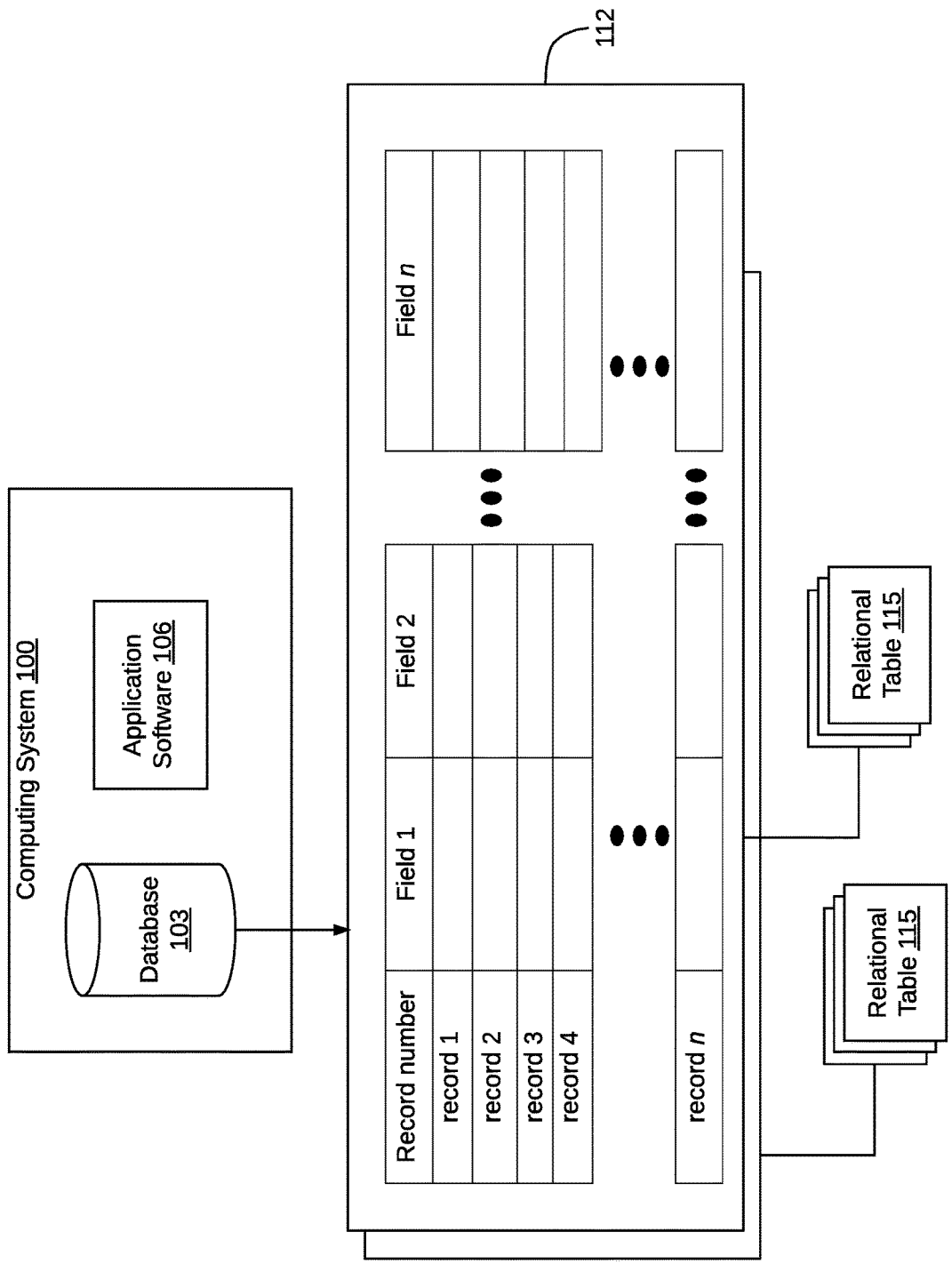
FIG. 1 is a drawing of a computing system 100 according to various embodiments of the present disclosure.

FIG. 1 shows a computing system 100 according to various embodiments. The computing system 100 is made up of a combination of hardware and software. The computing system 100 includes a database 103 and a software application 106. The computing system may be connected to networks such as the Internet, intranets, extranets, wide area networks (WANs), local area networks (LANs), wired networks, wireless networks, or other suitable networks, etc., or any combination of two or more such networks.

The computing system 100 may comprise, for example, a server computer or any other system providing computing capability. Alternatively, the computing system 100 may employ a plurality of computing devices that may be arranged, for example, in one or more server banks or computer banks or other arrangements. Such computing devices may be located in a single installation or may be distributed among many different geographical locations. For example, the computing system 100 may include a plurality of computing devices that together may comprise a hosted computing resource, a grid computing resource and/or any other distributed computing arrangement. In some cases, the computing system 100 may correspond to an elastic computing resource where the allotted capacity of processing, network, storage, or other computing-related resources may vary over time. The computing system may implement one or more virtual machines that use the resources of the computing system.

Various applications and/or other functionality may be executed in the computing system 100 according to various embodiments. Also, various data is stored in the database 103 or other memory that is accessible to the computing system 100. The database 103 may represent one or more databases 103.

The data stored in the database 103 includes one or more database tables 112. A database table includes several records, where each record has one or more corresponding fields. A database table 112 may be linked or otherwise associated with one or more relational tables 115. The components executed on the computing system 100 include software application 106 which is executed to access and optimize the contents of the database 103.

Next, a general description of the operation of the various components of the computing system 100 is provided. Various businesses or other entities utilize the computing system to store information in a database. For example, businesses may want to store records reflecting customers, products, transactions, events, items, or any other piece of information relevant to the business. Records are collected over time and stored in one or more database tables 112. For example, when a business gets a new customer, a software program may create a record reflecting the new customer. This record may include the customer's name, address, contact information, or any other information that identifies the customer. Such information is stored as fields within a database table.

In practice, a single record is sufficient to represent a customer or other real-world entity. However, it is possible that duplicate or redundant records are inadvertently or unintentionally created and/or exist within the database 103. For example, a customer may register with a business via an online portal which creates a customer record for that customer. Later, the same customer may inadvertently register again with the online portal, thereby creating a redundant customer record. As another example, two businesses maintaining their own customer records may merge such that the same customer may exist in two different database tables 112. The resulting merged database table could have redundant records.

When stored in a relational database, a database table 112 may be linked to one or more relational tables 115. For example, if an airline company maintained a database table 112 that stored customer records, there may be a relational table 115 storing the flight history for each customer. The contents of the relational table 115 links to a corresponding record.

The software application 106 of the present disclosure optimizes the database by processing one or more database tables 112 using stable IDs. Stable IDs are assigned to clusters of like records. According to various embodiments, rather than assigning random IDs, stable IDs may be assigned by first calculating stable IDs using a deterministic algorithm based on the contents of the records within the cluster. As a database table 112 is updated, the organization of the clusters may change. The software application 106 uses stable IDs to the extent that it does not compromise the accuracy of optimizing a database table. The functionality of the software application 106 is discussed in further detail with respect to the remaining figures.

FIG. 2 shows an example of a database table 112 of FIG. 1. A database table includes one or more records 201a-d, where each record has one or more fields 206a-b. A record may or may not have all its fields populated. Each record is intended to be dedicated to a real-world entity. A real-world entity may be a physical person, place, or thing. In the computing world, a real-world entity can be represented as a record containing information about the real-world entity. For example, "record 1" 201a is intended to be the record representing an individual named "Jane Johnson." "record 3" 201c is intended to be the record for "Jonathan Doe." "record 4" 201d may or may not be a redundant record with respect to "record 3" 201c. One purpose of the software application 106 (FIG. 1) is to cluster records (e.g., records 3 and 4) when it is believed that they reflect the same real-world entity.

FIG. 3 shows an initial set of clusters 304, also referred to as a first-generation set of clusters. The software application 106 (FIG. 1) accesses one or more database tables 112, identifies the records 201 (FIG. 2) in the database table 112 and organizes them into clusters. Clustering refers to a technique of grouping records 201 that have a degree of similarity that exceeds a threshold amount.

According to one embodiment, the software application 106 performs pairwise comparisons between different record pairs 201 to identify record pairs that are likely to be related. For example, the software application 106 may compare the fields 206 (FIG. 2) between two records. If the information contained in a particular number of fields 206 and/or a particular combination of fields 206 is in common, then the software application 106 may determine that two records 201 subject to the pairwise comparison are considered to be a related pair or unrelated pair. A related pair refers to two records that represent the same real-world entity and an unrelated pair refers to two records that represent different real-world entities. After the related pairs are identified, the software application 106 performs a transitive closure operation to group related pairs. For example, assume that "record 3" and "record 4" are related pairs, and in addition, "record 4" and "record 5" are related pairs. The transitive closure operation may determine that "record 3," "record 4," and "record 5" should be contained within the same cluster. After records 201 have been organized into clusters 304, the software application 106 assigns a stable ID 316a-f to each cluster. The software application may determine that a single record is organized within its own cluster. This may be referred to as a singleton cluster.

When stable IDs are assigned, the underlying records associated with a common stable ID continue to be stored in the database 103 (FIG. 1). In other words, rather than consolidating like records into a single, surviving record and then destroying the underlying records, the software application 106 maintains both the like records and the corresponding stable ID. This is advantageous when there are updates made to the database table 112 and a new cluster analysis is needed to be performed.

FIGS. 4A-C show examples of updates 402 to a database table 112 (FIG. 1) that take place after determining an initial set of clusters 304 (FIG. 3). FIG. 4A shows an update 402 made to a database table 112a that adds additional information about a preexisting record. In FIG. 4A, "record 4" does not have its first field 206 (FIG. 2) populated. After performing an initial clustering operation, it may be determined that "record 4" should not be clustered with any other records 201 (FIG. 2).

The database table 112a may be updated to generate an updated database table 428a. The updated database table 428a includes additional information about preexisting "record 4." When performing a subsequent cluster analysis, "record 3" and "record 4" may or may not be clustered depending on the update 402.

FIG. 4B shows an update 402 made to a database table 112b that adds a new record to generate an updated database table 428b. Here, "record 5" is added as a result of the update 402. When performing a subsequent cluster analysis, "record 3" and "record 5" may be clustered based on the update 402, or possibly "record 3," "record 4," and "record 5" may be clustered together. The addition of a new record into a cluster may strengthen the chances that another record should also be included through transitive association.

FIG. 4C shows an update 402 made to a database table 112c that removes a record to generate an updated database table 428c. Here, "record 4" is removed as a result of the update 402. Like the examples in FIGS. 4A and 4B, a subsequent cluster analysis may be performed in response to the update 402.

FIG. 5 builds on the example of FIG. 3. FIG. 5 shows a subsequent set of clusters 512, also referred to as a set of next generation clusters. As database tables are updated as discussed in FIGS. 4A-C, the software application 106 (FIG. 1) performs subsequent cluster analyses. This may lead to an identification of new clusters. A new cluster refers to a new grouping of records 201 (FIG. 2), regardless of whether those records were newly added or not, resulting from an update 402 (FIGS. 4A-C). For example, in FIG. 3, "record 2" was not grouped with any other record while "record 8" was part of a separate cluster. In FIG. 5, in response to an update 402 to the database table 112 (FIG. 1), the software application 106 has organized "record 2" and "record 8" into a new cluster. While records 2 and 8 previously existed, the clustering of records 2 and 8 is new. Similarly, "records 10-13" reflect a new cluster as a result of the update 402 because prior to the update 402, that specific grouping of records did not exist. FIG. 5 also shows how some clusters have not changed because of the update 402. For example, "record 1" continues to not be grouped with any other record. Also "records 3-7" continue to remain grouped without the addition or subtraction of any other records.

After the software application 106 performs a subsequent cluster analysis, the software application 106 then determines the stable IDs for the clusters. This is shown with respect to the remaining figures.

Figure 6A:
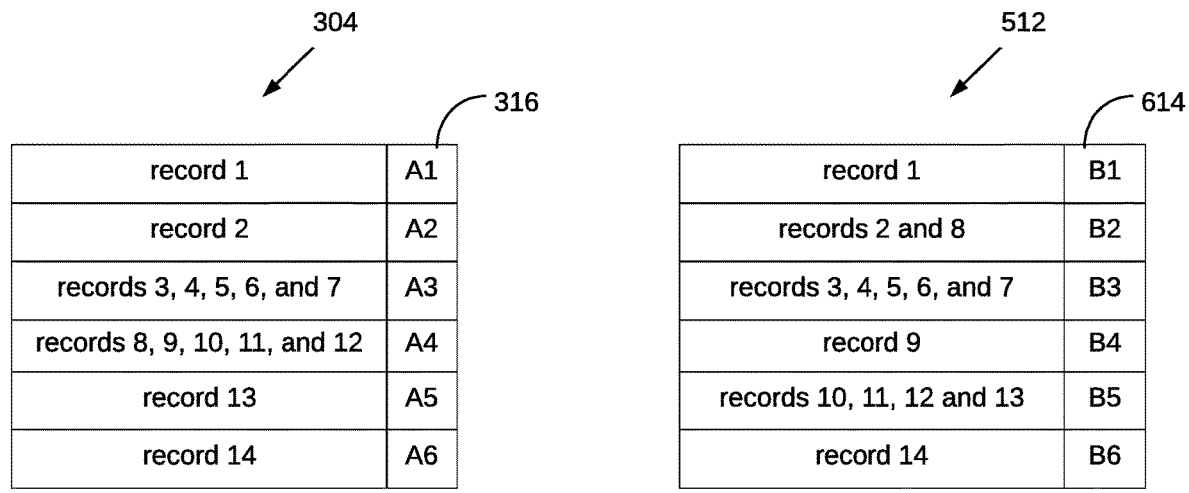
FIGS. 6A and 6B build on the example of FIG. 5 by explaining how two sets of clusters are compared to identify new clusters.

FIG. 6A builds on the example of FIGS. 3 and 5. FIG. 6A shows an example of an initial set of clusters 304 on the left and a subsequent set of clusters 512 on the right. As mentioned above, the software application 106 (FIG. 1) organized the records 201 (FIG. 2) of a database table 112 (FIG. 2) into a subsequent set of clusters in response to an update 402 (FIGS. 4A-C). As discussed above, the software application 106 assigned stable IDs 316 to the initial set of clusters 304. After identifying a subsequent set of clusters 512, as discussed with respect to FIG. 5, the software application 106 assigns temporary IDs 614 to the subsequent set of clusters 512. Temporary IDs 614 serve as a placeholder as the software application 106 determines which stable IDs will be reassigned to the subsequent set of clusters 512.

Figure 6B:
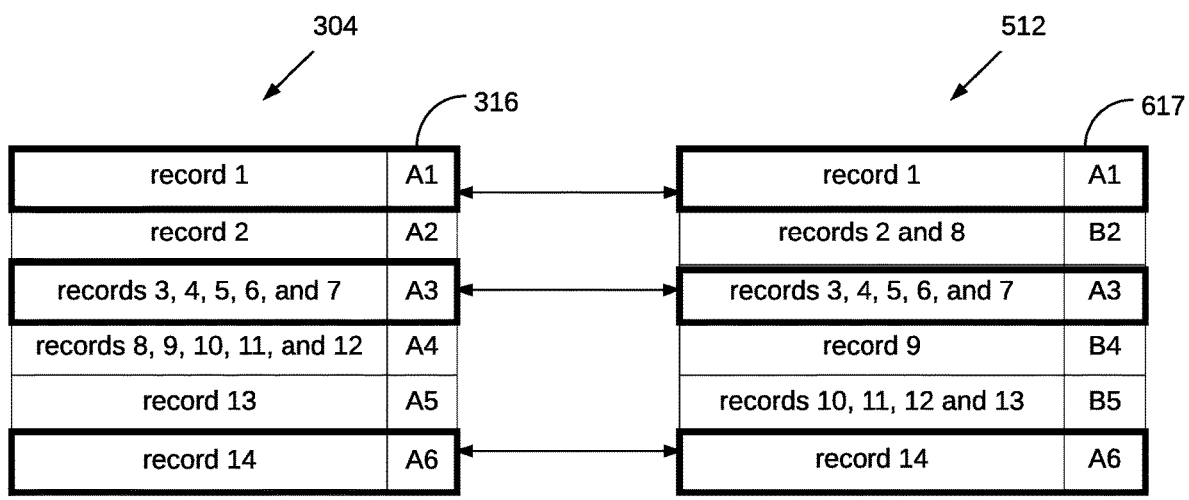

FIG. 6B shows a comparison performed by the software application 106 to identify exact matches of clusters that exist in both the initial set of clusters 304 and the subsequent set of clusters 512. An exact match occurs when two clusters consist of the same set of records 201. For example, the values in the fields of two records are identical or practically identical. When the software application 106 identifies an exact match for a given cluster, the stable ID 316 associated with that cluster is inherited by the corresponding cluster of the subsequent set of clusters 512. For example, "record 1," which has a stable ID of "A1" has an exact match with a cluster within the subsequent set of clusters 512. Accordingly, the software application 106 applies the stable ID "A1" 316*a* (FIG. 3) to the exactly matched cluster in the subsequent set of clusters 512. The same applies to stable IDs "A3" 316*c* and "A6" 316*f*. After finding exact matches of clusters, the software application 106 updates the temporary IDs 617 or otherwise transfers the stable IDs of the exactly matched clusters.

In various embodiments, prior to performing the comparison, the software application 106 removes from consideration any records that have been deleted with respect to the initial set of clusters 304 and any records that have been added with respect to the subsequent set of clusters 512. In this respect, only the records that overlap between the initial set of clusters 304 and the subsequent set of clusters 512 are compared to determine an exact match. For any new clusters made up of new records that are not part of the initial set of clusters 304, such new clusters are assigned new stable IDs that have not been previously assigned. For clusters within the subsequent set of clusters 512 that partially contain new records, the new records do not affect the stable ID reassignment process described below.

Figures 7A, 7B:
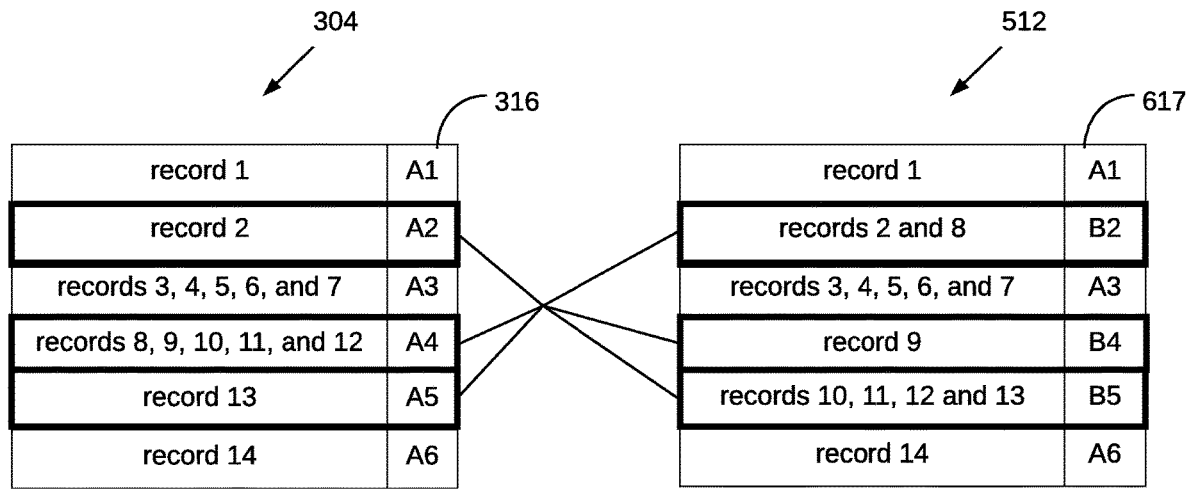
FIGS. 7A and 7B build on the example of FIGS. 6A and 6B by explaining how to reassign stable identifiers and how to assign new stable identifiers.

FIG. 7A continues the example from FIGS. 6A-B. FIG. 7A, depicts an example of how the software application 106 (FIG. 1) reassigns stable IDs to new clusters that were identified based on the comparison between the initial set of clusters 304 and the subsequent set of clusters 512. The software application 106 identifies new clusters in the subsequent set of clusters 512 that do not exist within the initial set of clusters 304. For example, the cluster that includes "record 2" and "record 8" has been given a temporary ID of "B2" and does not have an exactly matched cluster within the initial set of clusters 304. The same applies for "record 9," having a temporary ID of "B4" as well as "records 10-13," having a temporary ID of "B5." Thus, the clusters associated with temporary IDs "B2," "B4," and "B5" are considered new clusters with respect to the comparison.

FIG. 7B shows the example continuing from FIG. 7A, which demonstrates an example of how the software application reassigns stable IDs to new clusters. Here, the software application 106 generates a confusion matrix 731. The confusion matrix 731 may be a two-dimensional matrix where a first dimension represents at least some of the initial set of clusters and a second dimension represents at least some of the subsequent set of clusters. The example in FIG. 7B depicts a confusion matrix 731 that compares clusters within the subsequent set of clusters 512 that are not within the initial set of clusters 304 to clusters that are within the initial set of clusters 304 and that are not within the subsequent set of clusters 512. The purpose is for the software application 106 to determine which stable IDs 316 should be reassigned to the new clusters within the subsequent set of clusters 512.

The confusion matrix 731 includes matrix elements 734 which have a value based on comparing two respective clusters. These matrix elements 734 within the confusion matrix 731 relate to a quantity of overlapping record elements between a cluster in the initial set of clusters 304 and cluster in the subsequent set of clusters 512. Specifically, a set made up of records 1-3 and a set made up of records 2-4 will have a quantity of overlapping record elements of two. That is, records 2 and 3 overlap both sets of records, making the quantity two. The larger the overlap of record elements, the more two clusters have in common, and the stronger the match.

After creating the confusion matrix 731, the software application 106 applies an algorithm solving, optimally or approximately, the generalized assignment problem. In one embodiment, the software application 106 orders the clusters from largest to smallest quantity of overlapping record elements. In the example of FIG. 7B, the comparison of "A4" to "B5" has the largest quantity of overlapping record elements, the quantity being 3. Based on this, the software application 106 assigns the cluster associated with temporary ID "B5" to have the stable ID of "A4." In this respect, the software application 106 reassigns a stable identifier from the assigned identifiers of the initial set of clusters 304 to a newly identified cluster appearing in the subsequent set of clusters 512.

With "B5" being equated to "A4," the software application 106 moves to the next highest quantity of overlapping record elements. In the example of FIG. 7B, "B2" and "A2" overlap by 1 record element, which is "record 2." Accordingly, the software application 106 assigns the cluster associated with temporary ID "B2" to have the stable ID of "A2."

The remaining clusters that have not been matched are "A5" and "B4." These have no overlapping record elements. As a result, the software application 106 the cluster associated with the temporary identifier "B4" does not inherit a preexisting stable ID 316. Instead the software application 106 assigns this cluster a new stable ID after this determination. The new stable ID is unique with respect to the preexisting stable IDs assigned to the initial set of clusters 304.

Ultimately, in the example of FIG. 7B, the software application 106 attempts to match a cluster from the initial set of clusters 304 to a cluster from the subsequent set of clusters 512. When there is a match, the corresponding stable ID 316 is reassigned such that the cluster from the subsequent set of clusters inherits the stable ID 316 associated with the matched cluster from the initial set of clusters. Clusters that are not matched will be assigned a new stable ID that is not inherited. This is the case with the cluster represented by "B4."

In various embodiments of the present disclosure, the software application 106 uses a maximum matching algorithm such as, for example, a Hungarian Algorithm, to reassign stable IDs to subsequent sets of clusters. In this case, the software application 106 seeks to maximize the total number of overlapping records. For example, assume that an initial set of clusters includes A1 and A2, where A1=[records 1, 2, 3, and 4] and A2=[record 5]. Further assume that a subsequent set of clusters includes clusters B1 and B2, where B2=[records 1 and 3] and B2=[records 3, 4, and 5]. Each of the B1 and B2 clusters have two overlapping elements with respect to the A1 cluster. If B1 is matched to A1, then B2 is matched to A2, where B2 and A2 have one overlapping record. Under this matching configuration, the total of three records overlap. If B2 is matched with A1, then B1 is matched to A2, where B1 and A2 have no overlapping records. This arrangement results in a total of two overlapping records. By applying a maximum matching algorithm, the arrangement that results in more overlapping records is selected over other arrangements. Accordingly, the B1 cluster will be assigned the stable ID associated with the A1 cluster and the B2 cluster will be assigned the stable ID associated with the A2 cluster.

Figure 8:
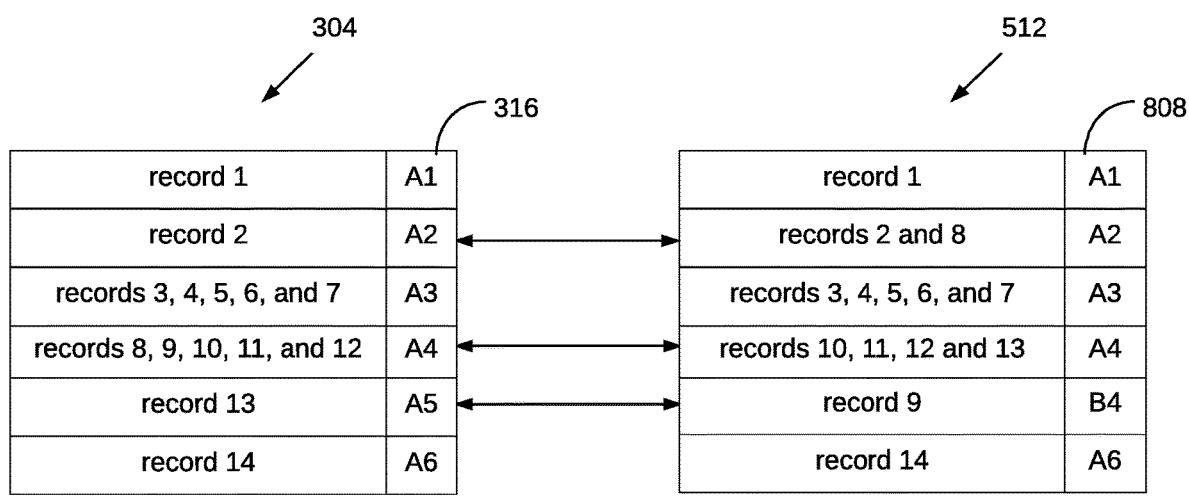
FIG. 8 builds on the example of FIGS. 7A and 7B by showing an example of stable identifiers.

FIG. 8 shows the outcome of the comparison and ID reassignment discussed with respect to FIGS. 6 and 7. FIG. 8 shows a software application 106 that organized records 201 (FIG. 1) of a database table 112 into an initial set of clusters 304 having corresponding stable IDs 316. In response to an update to the database table 112 (FIG. 1), the software application 106 reorganizes the records 201 in the updated database 428 (FIGS. 4A-C) into a subsequent set of clusters 512. After performing a comparison between the initial set of clusters 304 and the subsequent set of clusters 512 (as discussed with respect to FIGS. 6 and 7), the software application 106 reassigns the stable IDs 316 associated with the initial set of clusters 304 to identically matched or similarly matched clusters existing within the subsequent set of clusters 512. In addition, the software application 106 assigns new stable IDs to new clusters that do not sufficiently match a cluster within the initial set of clusters 304. This results in stable IDs 808, where at least a portion of which originated from the stable IDs 316 from the initial set of clusters 304.

In various embodiments, the database table 112 is initially linked to one or more relational tables 115 (FIG. 1). Those relational links are maintained after the stable IDs are initially assigned or subsequently reassigned. The use of stable IDs is advantageous in this context because the relational tables 115 do not need to be rebuilt. Specifically, the underlying records are preserved such that the remaining records are linked to relational tables 115.

Figure 9:
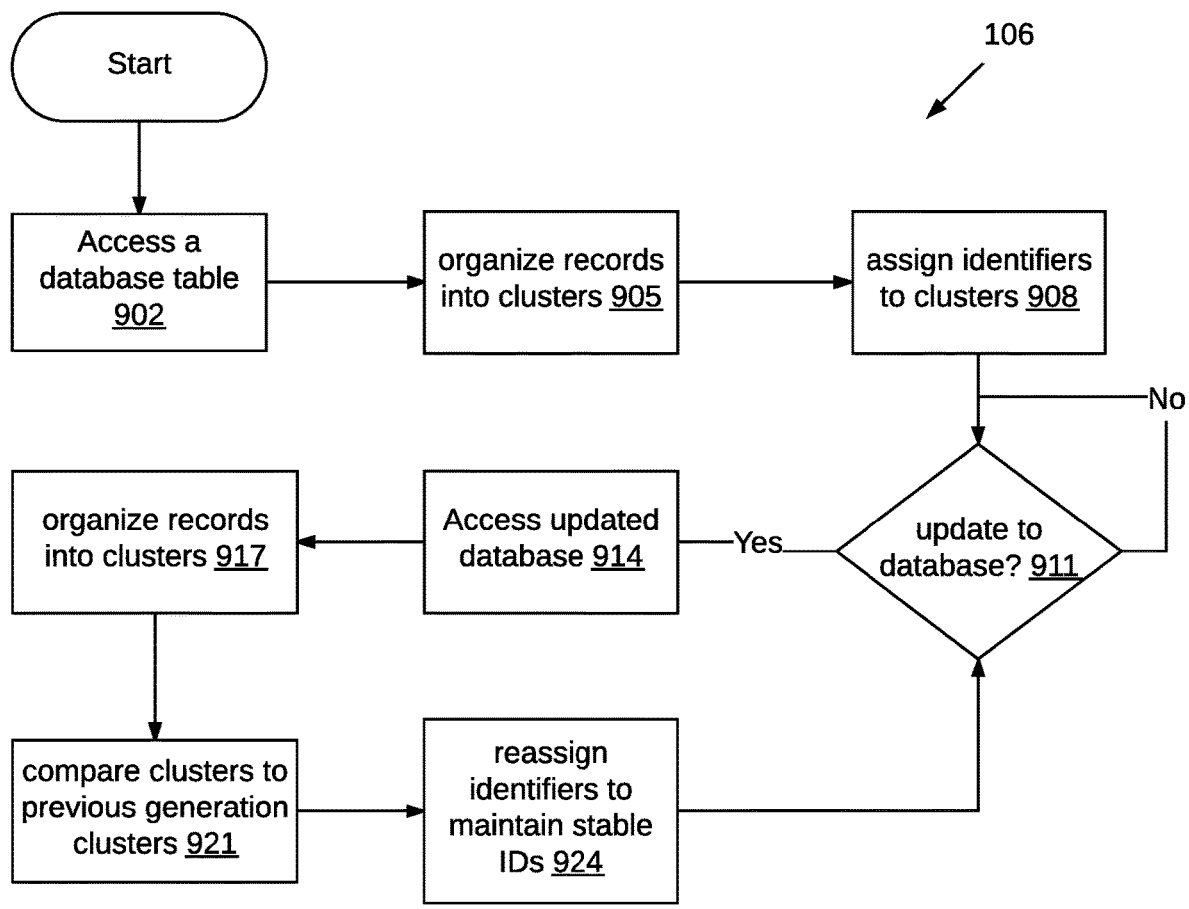
FIG. 9 is a flowchart illustrating an example of the functionality of the software application executed in a computing system 100 of FIG. 1 according to various embodiments of the present disclosure.

FIG. 9 is a flowchart that provides an example of the operation of the software application 106 according to various embodiments. It is understood that the flowchart of FIG. 9 provides merely an example of the many different types of functional arrangements that may be employed to implement the operation of the portion of the software application as described herein. As an alternative, the flowchart of FIG. 9 may be viewed as depicting an example of elements of a method implemented in the computing system 100 (FIG. 1) according to one or more embodiments.

Beginning at 902 a software application 106 accesses one or more database tables 112 (FIG. 1). Here, the software application 106 identifies records 201 (FIG. 1) included within a database table 112. While two or more records may occupy separate lines within the database table 112, it is possible that these records reflect the same real-world entity, whether it be the identity of a customer, an object, an event, or any other real-world entity. The software application 106 is configured to cluster like records, as discussed in more detail below.

At 905 the software application 106 organizes records 201 into clusters 304 (FIG. 3) based on a similarity among the records. These clusters may be referred to as an initial set of clusters or first-generation clusters 304. The software application 106 may use clustering techniques such as pairwise comparisons and transitive closure operations to determine whether the records 201 of a common cluster are similar.

When organizing the records into clusters, the software application 106 may begin by performing a blocking operation to coarsely select record pairs that share some related information and which could represent the same real-world entity. For example, a blocking function may operate to determine if two records are sufficiently similar enough that they might be classified as a related record pair. This may involve determining which field values 206 are similar or are the same. One example of a blocking function is to compare a "social security number (SSN)" field. Two records having the same SSN field values likely means that the two records form a related pair. Another example of a blocking function is to compare the first three characters of a first name field and first three characters of a last name field between two records. By performing a plurality of blocking operations, a relatively large set of records is reduced in size to include an over-inclusive set of records that are likely to be a part of a related pair.

The software application 106 may then identify groups of related pairs of records from within those blocks where each related pair of records has a degree of similarity that exceeds a threshold amount. Here, the software application 106 compares the different fields between two records to determine whether the two records should be deemed a match. In one embodiment, the software application 106 uses a binary classifier to evaluate whether the fields of two records are sufficiently similar. The binary classifier may be configured to operate according to a threshold amount. A lower threshold may result in more matches with a risk of error while high threshold may result in fewer matches with less risk of error. After records have been paired, the software application 106 may cluster a group of related pairs using transitive closure. Different subsets of related pairs form corresponding clusters. These clusters form an initial set of clusters 304.

At 908 the software application 106 assigns identifiers to the clusters. These identifiers are referred to as stable identifiers 316 (FIG. 3) because they persist through iterations of updates made to the underlying database table 112. Stable IDs 316 may be named based on the contents of the records. For example, different field values may be concatenated to generate a stable ID that is deterministic. Here, a stable ID name of a cluster of records having a first name field value of "John" and a last name field value Doe" may be "johndoe."

At 911 the software application waits for an update 402 (FIG. 4) to the database. An update may include updating or modifying a preexisting record, adding a new record, or deleting a record. The software application 106 receives a notification that the database or database table 112 has been updated.

At 914, in response to an updated database or database table, the software application 106 accesses the updated database table 112. The software application 106 identifies records 201 included within the updated database table 428 (FIG. 4).

At 917 the software application 106 organizes records 201 in the updated database table 428 into clusters 512 (FIG. 5) based on a similarity among the records. These clusters may be referred to as a subsequent set of clusters or a second (or third, fourth, etc.) generation clusters. The software application 106 may use clustering techniques discussed above to generate the clusters.

The database 103 persistently stores the database table 112 along with the updated records after the processor organizes the updated records into the plurality of subsequent clusters. In other words, clustered records are not collapsed into a single record such that the underlying data of each record is destroyed. Thus, the flowchart of FIG. 9 shows to be a more accurate clustering technique as records are updated.

At 921 the software application compares the subsequent set of clusters 512 to the initial set of clusters 304. Stated another way, the software application compares a current generation of clusters to a prior generation of clusters. By performing the comparison, the software application 106 may identify new clusters that are within the subsequent set of clusters 512 but not within the plurality of initial clusters 304.

The comparison may involve identifying exact matches of clusters between the plurality of initial clusters 304 and the plurality of subsequent clusters 512, as shown in FIG. 6B. The software application 106 may remove the exact matches from consideration to isolate the new clusters.

At 924 the software application 106 reassigns identifiers to maintain stable IDs. Specifically, the software application determines which stable IDs from a previous generation of clusters can be applied to new clusters identified in response to the comparison. To accomplish this, the software application may generate a confusion matrix 731, as shown in FIG. 7B. A purpose of the confusion matrix 731 is to determine strengths of similarity between at least some of the subsequent set of clusters 512 and some of the initial set of clusters 304. A strength of similarity quantifies the degree in which two clusters within two different sets are similar. This may be calculated by determining the number, percentage, ratio, or other metric that relates to the quantity of overlapping record elements between two clusters.

By comparing the new clusters with respect to at least some of the prior generation clusters, the software application 103 determines which stable IDs should be inherited from the prior generation clusters. However, it may be the case that a new cluster should not inherit any of the stable IDs. In that case, a stable ID is not reassigned, but rather, a new stable ID is generated. The new stable ID may be generated based on a deterministic algorithm using the contents of the record as inputs. For example, field values may be concatenated to yield a new stable ID.

After stable IDs are reassigned and/or after new stable IDs are assigned, the software application 106 waits for additional updates. In the event there is an additional update, the software application 106 performs another iteration as depicted in reference numbers 914, 917, 921, and 924. According to various embodiments, the software application 106 determines whether a prior generation cluster is faulty, defective, or otherwise inaccurate. In this case, the software application compares one or more current generation of clusters with one or more clusters from a generation of clusters existing before the prior generation cluster. For example, third-generation clusters may be compared with first-generation clusters if updates affecting the second-generation updates are faulty, defective, or otherwise inaccurate.

Figure 10:
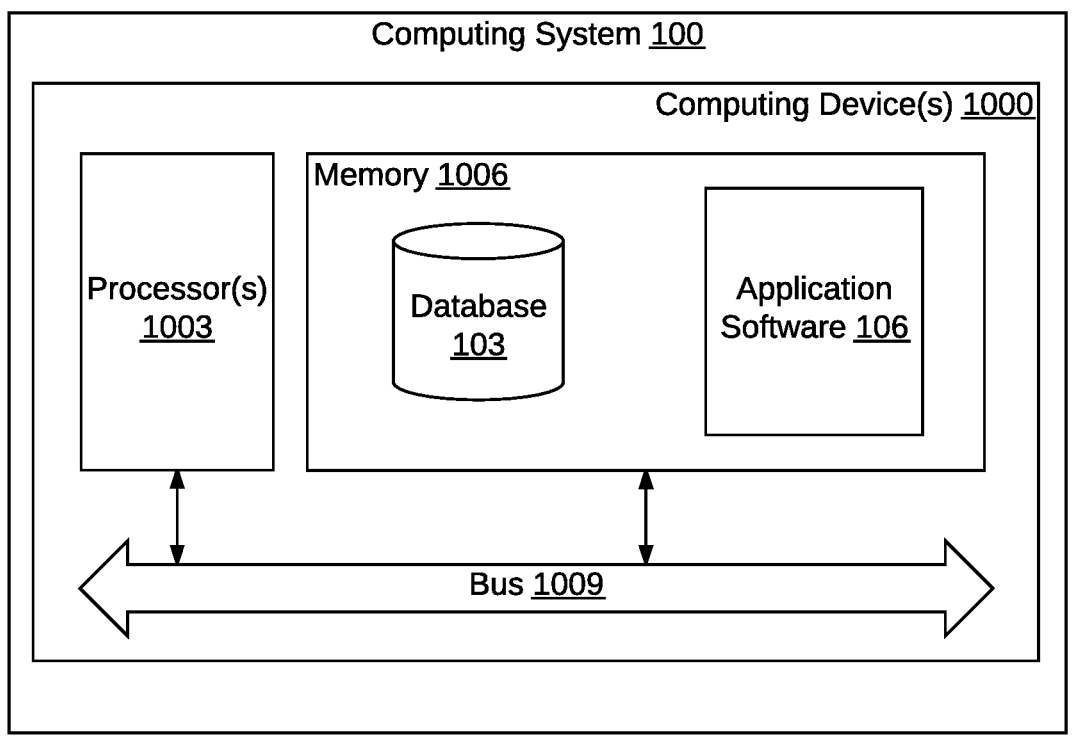
FIG. 10 is a schematic block diagram that provides one example illustration of a computing system of FIG. 1 according to various embodiments of the present disclosure.

FIG. 10 shows a schematic block diagram of the computing system 100 according to an embodiment of the present disclosure. The computing system 100 includes one or more computing devices 1000. Each computing device 1000 includes at least one processor circuit, for example, having a processor 1003 and a memory 1006, both of which are coupled to a local interface 1009 or bus. To this end, each computing device 1000 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 is the software application 106. Also stored in the memory 1006 may be a database 103 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

Several software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the software application 106 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 9 shows the functionality and operation of an implementation of the software application 106. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more boxes may be scrambled relative to the order shown. Also, two or more boxes shown in succession in FIG. 9 may be executed concurrently or with partial concurrence. Further, in some embodiments, one or more of the boxes shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software application 106 may also comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application 106, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 1000, or in multiple computing devices in the same computing system 1003. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should Therefore, the following is claimed:

1. A system comprising:
   a processor;
   a database that stores a database table, the database table comprising a plurality of records; and
   a memory coupled to the processor, the memory comprising a plurality of instructions that cause the processor to:
      associate a plurality of initial clusters of the plurality of records to respective identifiers;
      organize the plurality of records into a plurality of subsequent clusters in response to at least one record among the plurality of records being modified;
      compare the plurality of subsequent clusters to the plurality of initial clusters to identify at least one new cluster that is not part of the plurality of initial clusters; and
      reassign an identifier among the respective identifiers to the at least one new cluster.

2. The system of claim 1, wherein the plurality of instructions that cause the processor to compare, further comprises instructions that cause the processor to:
   identify exact matches of clusters between the plurality of initial clusters and the plurality of subsequent clusters.

3. The system of claim 1, wherein the plurality of instructions that cause the processor to reassign, further comprises instructions that cause the processor to generate a confusion matrix, wherein each matrix element in the confusion matrix relates to a quantity of overlapping record elements between a respective initial cluster and a respective subsequent cluster.

4. The system of claim 1, wherein the plurality of instructions that cause the processor to reassign, further comprises instructions that cause the processor to determine strengths of similarity between at least a portion of the plurality of subsequent clusters and at least a portion of the plurality of initial clusters.

5. The system of claim 4, wherein the strengths of similarity are based on a number, percentage, or ratio relating to a quantity of overlapping record elements between two respective clusters.

6. The system of claim 1, wherein the plurality of instructions further cause the processor to assign a new identifier other than the respective identifiers to another new cluster in response to determining that the another new cluster is not similar to the plurality of initial clusters.

7. The system of claim 1, wherein the database persistently stores the database table after the processor organizes the updated plurality of records into the plurality of subsequent clusters.

8. The system of claim 1, wherein the plurality of instructions that cause the processor to compare, further comprises instructions that cause the processor to organize the plurality of records into the plurality of initial clusters by:
   performing a plurality of blocking operations to identify records that are likely to be classified as related pairs;
   identifying a plurality of record pairs, each record pair having a degree of similarity that exceeds a threshold amount; and
   clustering the plurality of record pairs to generate the plurality of initial clusters.

9. A system comprising:
   a database storing a plurality of records; and
   a processor in data communication with the database, the processor being configured to:
      generate a plurality of first-generation clusters comprising non-overlapping sets of records among the plurality of records;
      assign identifiers to identify each first-generation cluster among the plurality of first-generation clusters;
      generate a plurality of second-generation clusters comprising non-overlapping sets of records among an updated plurality of records, wherein the updated plurality of records comprises a modified version of the plurality of records such that at least one record is modified; and
      reassign an identifier among the assigned identifiers to a new cluster, the new cluster being present in the second-generation clusters but not in the first-generation clusters.

10. The system of claim 9, wherein the processor is configured to compare the plurality of second-generation clusters to the plurality of first-generation clusters to identify the new cluster.

11. The system of claim 9, wherein the processor is further configured to:
   update the updated plurality to generate a subsequent updated plurality of records;
   generate a plurality of third-generation clusters comprising non-overlapping sets of records among the subsequent updated plurality of records;
   compare the plurality of third-generation clusters to the plurality of second-generation clusters to identify at least one additional cluster that is not part of the plurality of second-generation clusters; and
   reassign at least one additional identifier among the assigned identifiers to the at least one additional cluster.

12. The system of claim 9, wherein the identifier is reassigned to the new cluster in response to generating a confusion matrix.

13. The system of claim 12, wherein the confusion matrix comprises a first dimension representing at least a portion of the plurality of first-generation clusters and a second dimension representing at least a portion of the plurality of second-generation clusters, wherein each matrix element in the confusion matrix relates to a quantity of overlapping record elements between a respective first-generation cluster and a respective second-generation cluster.

14. The system of claim 9, wherein the database persistently stores the plurality of records after the processor reassigns the identifier.

15. A computer implemented method comprising:
   generating a plurality of first-generation clusters comprising non-overlapping sets of records among a plurality of records;
   assigning identifiers to each of the first-generation clusters;
   generating a plurality of second-generation clusters comprising non-overlapping sets of records among an updated plurality of records, wherein the updated plurality of records comprises a modified version of the plurality of records such that at least one record is modified;

comparing the plurality of second-generation clusters to the plurality of first-generation clusters;

maintaining the identifiers for clusters that are common with respect to the first-generation clusters and second-generation clusters based on the comparing; and reassigning at least one identifier among the assigned identifiers to at least one new cluster.

16. The method of claim 15, wherein the identifiers are named according to a contents of a corresponding cluster.

17. The method of claim 15, further comprising:

updating the plurality of records to generate an updated second plurality of records;

generating a plurality of third-generation clusters comprising non-overlapping sets of records among the updated second plurality of records;

comparing the plurality of third-generation clusters to the plurality of second-generation clusters to identify at least one additional cluster that is not part of the plurality of second-generation clusters; and reassigning at least one additional identifier among the assigned identifiers to the at the least one additional cluster.

18. The method of claim 15, wherein reassigning at least one identifier comprises generating a confusion matrix.

19. The method of claim 18, wherein the confusion matrix comprises a first dimension representing at least a portion of the plurality of first-generation clusters and a second dimension representing at least a portion of the plurality of second-generation clusters, wherein each matrix element in the confusion matrix relates to a quantity of overlapping record elements between a respective first-generation cluster and a respective second-generation cluster.

20. The method of claim 15, wherein a database persistently stores the plurality of records after assigning the identifiers.

* * * * *